(12) United States Patent
Ikawa et al.

(10) Patent No.: US 10,834,042 B2
(45) Date of Patent: Nov. 10, 2020

(54) INFERENCE OF LOCATION WHERE EACH TEXTUAL MESSAGE WAS POSTED

(71) Applicant: INTERNATIONAL BUSINESS MACHINES CORPORATION, Armonk, NY (US)

(72) Inventors: Yohei Ikawa, Tokyo (JP); Rudy Raymond Harry Putra, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 712 days.

(21) Appl. No.: 14/841,247

(22) Filed: Aug. 31, 2015

(65) Prior Publication Data

US 2017/0061323 A1    Mar. 2, 2017

(51) Int. Cl.
*H04L 12/58*    (2006.01)
*G06N 7/00*    (2006.01)

(52) U.S. Cl.
CPC .............. *H04L 51/20* (2013.01); *H04L 51/32* (2013.01); *G06N 7/005* (2013.01)

(58) Field of Classification Search
CPC .......... G06N 7/005; G06N 5/00; H04L 51/20; H04L 51/32; H04M 3/42348;
(Continued)

(56) References Cited

U.S. PATENT DOCUMENTS

2012/0166367 A1* 6/2012 Murdock ............... G06Q 30/02
                                                             706/12
2013/0086072 A1    4/2013 Peng et al.
(Continued)

FOREIGN PATENT DOCUMENTS

WO    WO2014165306 A1    10/2014

OTHER PUBLICATIONS

Roller, S. et al., "Supervised text-based geolocation using language models on an adaptive grid," Proc. of the 2012 Joint Conf. on Empirical Methods in Natural Language Processing and Computational Natural Language Learning (Jul. 2012) pp. 1500-1510. (Year: 2012).*

(Continued)

*Primary Examiner* — Kakali Chaki
*Assistant Examiner* — Brian M Smith
(74) *Attorney, Agent, or Firm* — Tutunjian & Bitetto, P.C.; Randall Bluestone

(57) ABSTRACT

A method for inferring a location where each textual message was posted by a test user method includes partitioning an area into a plurality of sub-areas, associating textual messages posted by training users with respective sub-areas where each textual message was posted, extracting a keyword characterizing each sub-area among one or more keywords obtained from each textual message posted by the training users associated with each sub-area, constructing a feature vector of the given sub-area based on each extracted keyword, computing a transition probability for the given sub-area by time-series of location information associated with the textual messages posted by the training user, computing a plurality of scores of each location, using the feature vector, where each textual message was posted by the test user, and computing, based on the plural scores and the transition probability, time-series of locations where each textual message was posted by the test user.

20 Claims, 12 Drawing Sheets

(58) Field of Classification Search
CPC ..... H04W 4/025; H04W 4/026; H04W 4/027; H04W 4/028; H04W 4/02; G06F 17/3087; G06F 17/30241; G06F 16/21; G06F 17/30867; G06F 17/3082; Y10S 707/919; G06Q 30/02; G06Q 30/0205
See application file for complete search history.

(56) References Cited

U.S. PATENT DOCUMENTS

| | | | | |
|---|---|---|---|---|
| 2014/0143346 | A1* | 5/2014 | Mahmud | G06Q 30/0201 709/206 |
| 2014/0274022 | A1* | 9/2014 | Bell | G06F 16/21 455/418 |
| 2015/0046452 | A1* | 2/2015 | Agrawal | G06F 17/30241 707/737 |
| 2016/0205509 | A1* | 7/2016 | Hopcraft | H04W 4/028 455/456.1 |
| 2016/0328661 | A1* | 11/2016 | Reese | G06N 99/005 |

OTHER PUBLICATIONS

Kalogerakis, E. et al., "Image sequence geolocation with human travel priors," 2009 IEEE 12th Intl. Conf. on Computer Vision (2009 ICCV) pp. 253-260. (Year: 2009).*

Collins, M., "The forward-backward algorithm," downloaded from <http://www.cs.columbia.edu/~mcollins/fb.pdf> and verified online as of at least Jul. 14, 2012 by web.archive.org (Year: 2012).*

Madsen, R. et al., "Modeling word burstiness using the dirichlet distribution," 22nd Intl. Conf. on Machine Learning (2005) 8 pp. (Year: 2005).*

Paraskevopoulos, P. et al., "Fine-grained geolocalisation of non-geotagged tweets," Proc. of the 2015 IEEE/ACM Intl. Conf. on Advances in Social Network Analysis and Mining (Aug. 25-28, 2015) 8 pp. (Year: 2015).*

Thom, D. et al., "Inverse document density: a smooth measure for location-dependent term irregularities," Proc. of COLING 2012 (2012) pp. 2603-2618. (Year: 2012).*

Ahmed, A., "Hierarchical Geographical Modeling of User Locations from Social Media Posts," Proceedings of the 22nd international conference on World Wide Web, May 2013. (pp. 1-11).

Dredze, M. et al., "Carmen: A Twitter Geolocation System with Applications to Public Health," Johns Hopkins University, Aug. 2013. (pp. 1-5).

Han, B. et al., "Text-Based Twitter User Geolocation Prediction," Journal of Artificial Intelligence Research, No. 49, Mar. 2014. (pp. 1-50).

Li, C. et al., "Location Inference Using Microblog Text and Friendships," 2014 IEEE/ACM International Conference on Advances in Social Networks Analysis and Mining, Aug. 2014. (pp. 1-7).

Liu, H. et al., "Location Type Classification Using Tweet Content," 11th International Conference on Machine Learning and Applications, Dec. 2012. (pp. 1-6).

Wang, X. et al., "A Location Inferring Model Based on Tweets and Bilateral Follow Friends," Journal of Computers vol. 9 No. 2, Feb. 2014. (pp. 1-7).

* cited by examiner

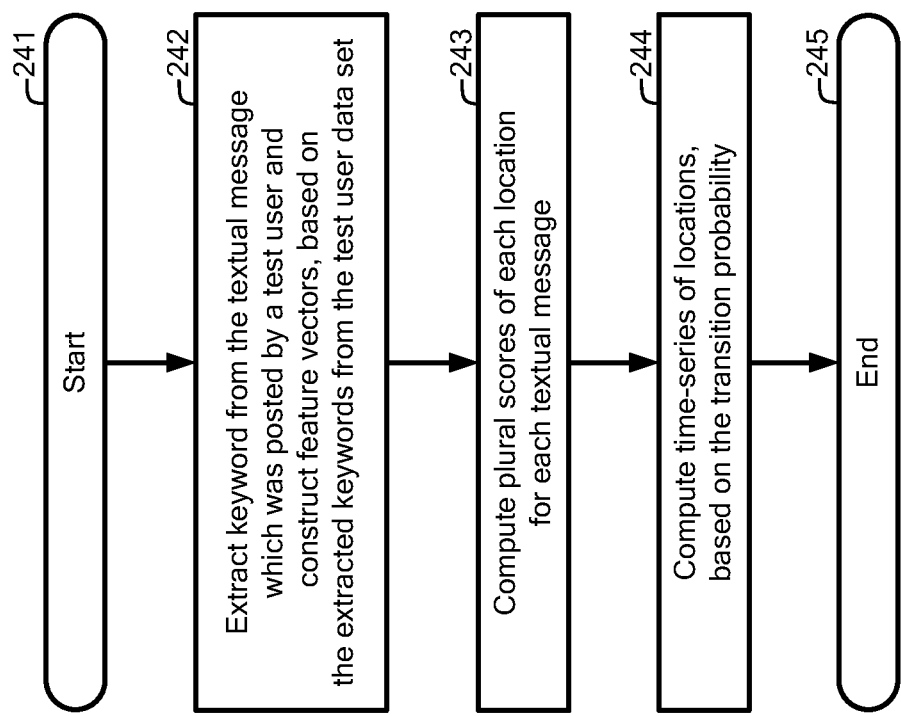

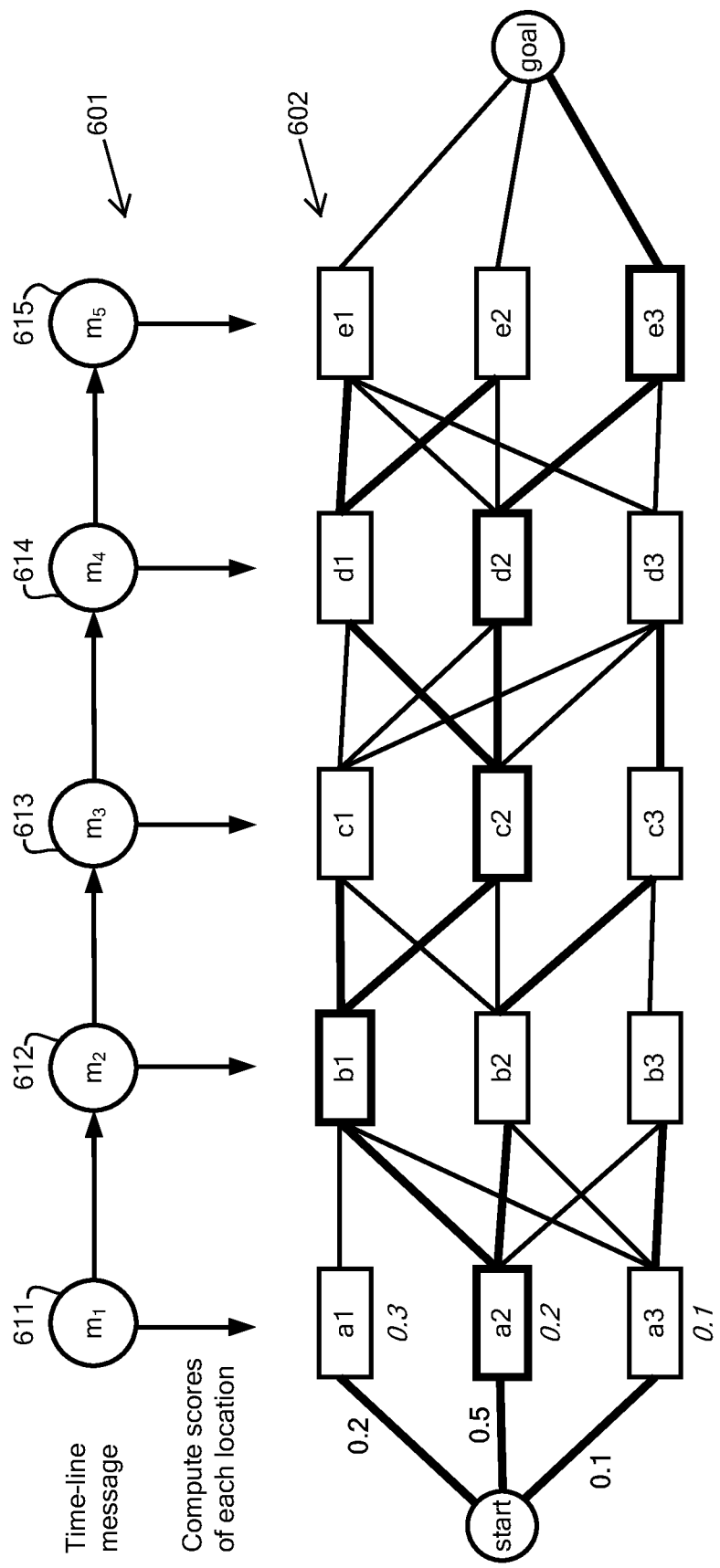

ical Field

INFERENCE OF LOCATION WHERE EACH TEXTUAL MESSAGE WAS POSTED

BACKGROUND

Technical Field

The present invention relates to a method for inferring a location where a textual message by a test user was posted.

Related Art

In recent years, location-based data are now increasingly prevalent with the rapid increase in adoption of mobile devices, such as smartphones, mobile phones, tablets, etc. The task of inferring users' locations within a time interval is becoming important in order to characterize Social Networking Service (SNS) users, such as Facebook®, Twitter®, Foursquare®, Instagram® or LINE® users.

However, due to privacy reasons, most SNS users do not reveal their exact locations (such as GPS latitude/longitude), and, therefore, their locations can only be determined from limited information that they share publicly, such as their textual messages (e.g., tweets).

Previous research has proposed methods to identify users' static locations, such as home city, state, or country, but such methods do not consider the dynamic movement of users.

SUMMARY

According to the present principles, a computer-implemented method for inferring a location where each textual message was posted by a test user is provided. The method includes partitioning an area into plural sub-areas, associating each of textual messages posted by training users with a sub-area where each of the textual message was posted, each device location of the training users being open to the public, extracting a keyword from each textual message posted by the training users associated with each sub-area, calculating features of the extracted keyword, constructing a feature vector of each sub-area based on the features of the extracted keyword, computing a transition probability for each sub-area by time-series of location information associated with the textual messages posted by the training user, the transition probability being a probability of transition from a target sub-area to other sub-areas, computing plural scores of each location, using the feature vector, where each textual message was posted by the test user, and computing, based on the plural scores and the transition probability, time-series of locations where each textual message was posted by the test user.

According to another aspect of the present principles, a system, such as a computer system, including a computer readable storage medium storing a program of instructions executable by the system to perform one or more methods described herein may be provided.

According to another aspect of the present principles, a computer program product including a computer readable storage medium storing a program of instructions executable by the computer system to perform one or more methods described herein also may be provided.

These and other features and advantages will become apparent from the following detailed description of illustrative embodiments thereof, which is to be read in connection with the accompanying drawings.

BRIEF DESCRIPTION OF THE DRAWINGS

FIGS. 2A to 2E illustrate a flowchart of a method for inferring a location where each textual message was posted by a test user, in accordance with one embodiment;

FIG. 6 illustrates one embodiment of computing of the time-series of locations by re-ranking the time series of locations with the Viterbi algorithm, based on the transition probability.

DETAILED DESCRIPTION OF THE EMBODIMENTS

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The terms used herein are not intended to be limited to any particular narrow interpretation unless clearly stated otherwise in the specification.

The term, a training user, refers to a user who has a device associated with the training user from which time series of textual messages posted by the training user and locations associated with each of the textual messages are sent. A location where the textual message posted by the training user can be obtained in relation to the textual message. The location of the device associated with the training user is open to the public or publicly shared in relation to each textual message. The textual message is posted by the training user via a SNS, such as Facebook®, Twitter®, Foursquare®, Instagram® or LINE®.

The term, a test user, refers to a user who has a device associated with the test user from which time series of textual messages posted by the test user are sent. However, a location where the textual message posted by the test user cannot be obtained in relation to the textual messages, when the test user denies to add the geotag with a textual message. The textual message is posted by the test user via a SNS, such as Facebook®, Twitter®, Foursquare®, Instagram® or LINE®. The test user may be dynamically moving with the device.

Figure 1:
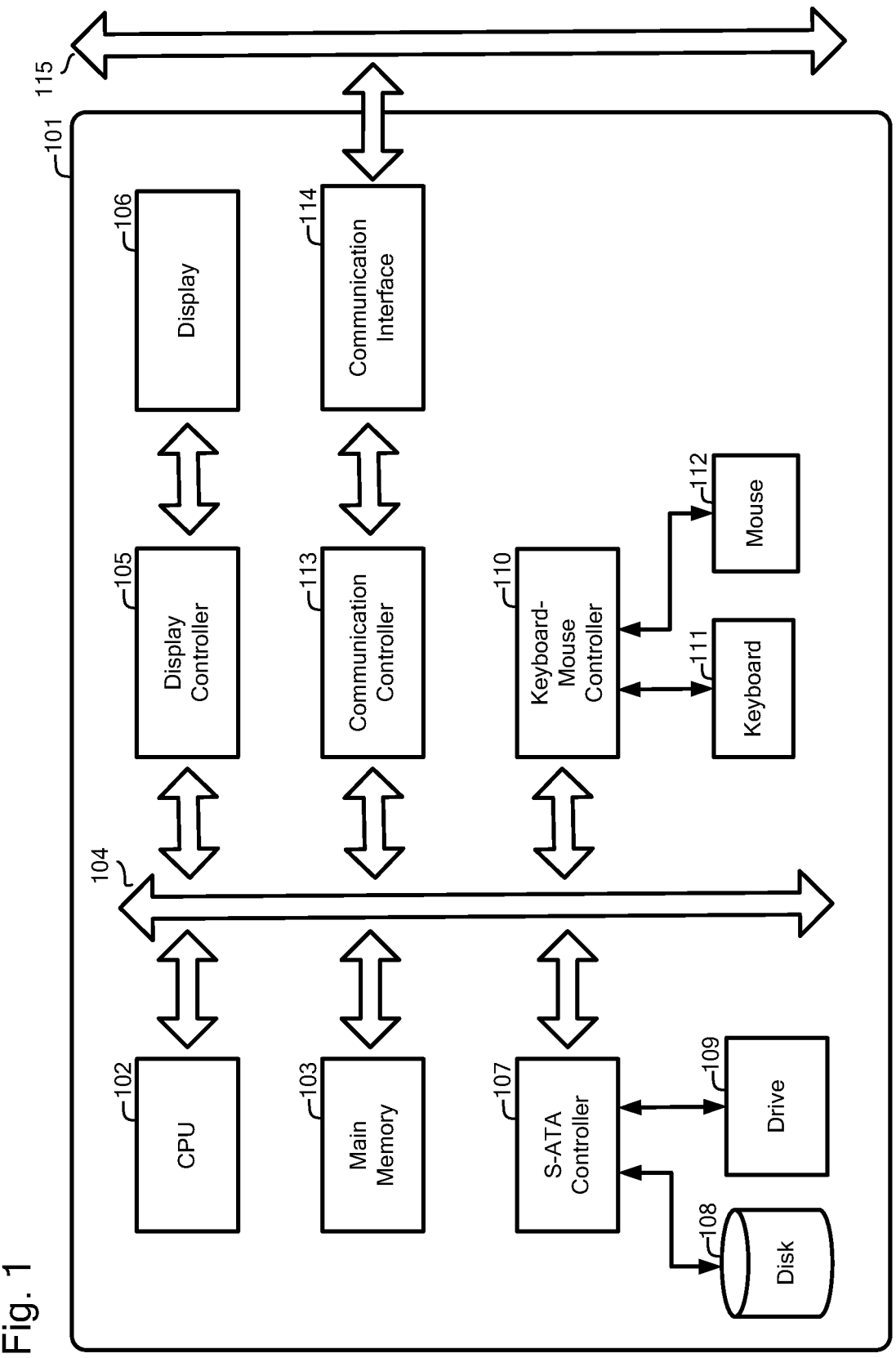
FIG. 1 illustrates an exemplified block diagram of a computer hardware used in an embodiment of the present invention.

With reference now to FIG. 1, FIG. 1 illustrates exemplified block diagram of a computer hardware used in an embodiment of the present invention.

A computer (101) may be, for example, but is not limited to, a desktop, a laptop, a notebook, a tablet or a server computer. The server computer may be, for example, but is not limited to, a workstation, a rack-mount type server, a blade type server, or a mainframe server and may run, for example, a hypervisor for creating and running one or more virtual machines. The computer (101) comprises one or more computer processing units (CPUs) (102) and a main memory (103) connected to a bus (104). The CPU (102) may be preferably based on a 32-bit or 64-bit architecture. The CPU (102) may be, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106), such as a liquid crystal display (LCD), may be connected to the bus (104) via a display controller (105). The display (106) may be used to display, for management of the computer(s), information on a computer connected to a network via a communication line and information on software running on the computer using an appropriate graphics interface. A disk (108), such as a hard disk or a solid state drive (SSD), and a drive (109), such as a CD, a DVD, or a Blu-ray disk (BD) drive, may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data may be stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (103) or the disk (108), if necessary.

A communication interface (114) may be based on, for example, but is not limited to, the Ethernet® protocol. The communication interface (114) may be connected to the bus (104) via a communication controller (113), which physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

With reference now to FIGS. 2A to 2E, FIGS. 2A to 2E illustrate one embodiment of a method for inferring a location where each textual message was posted by a test user.

A system, such as the computer (101) of FIG. 1, may perform the method described in FIGS. 2A to 2E. The system may be implemented as a single computer or a plurality of computers.

Figure 2A:
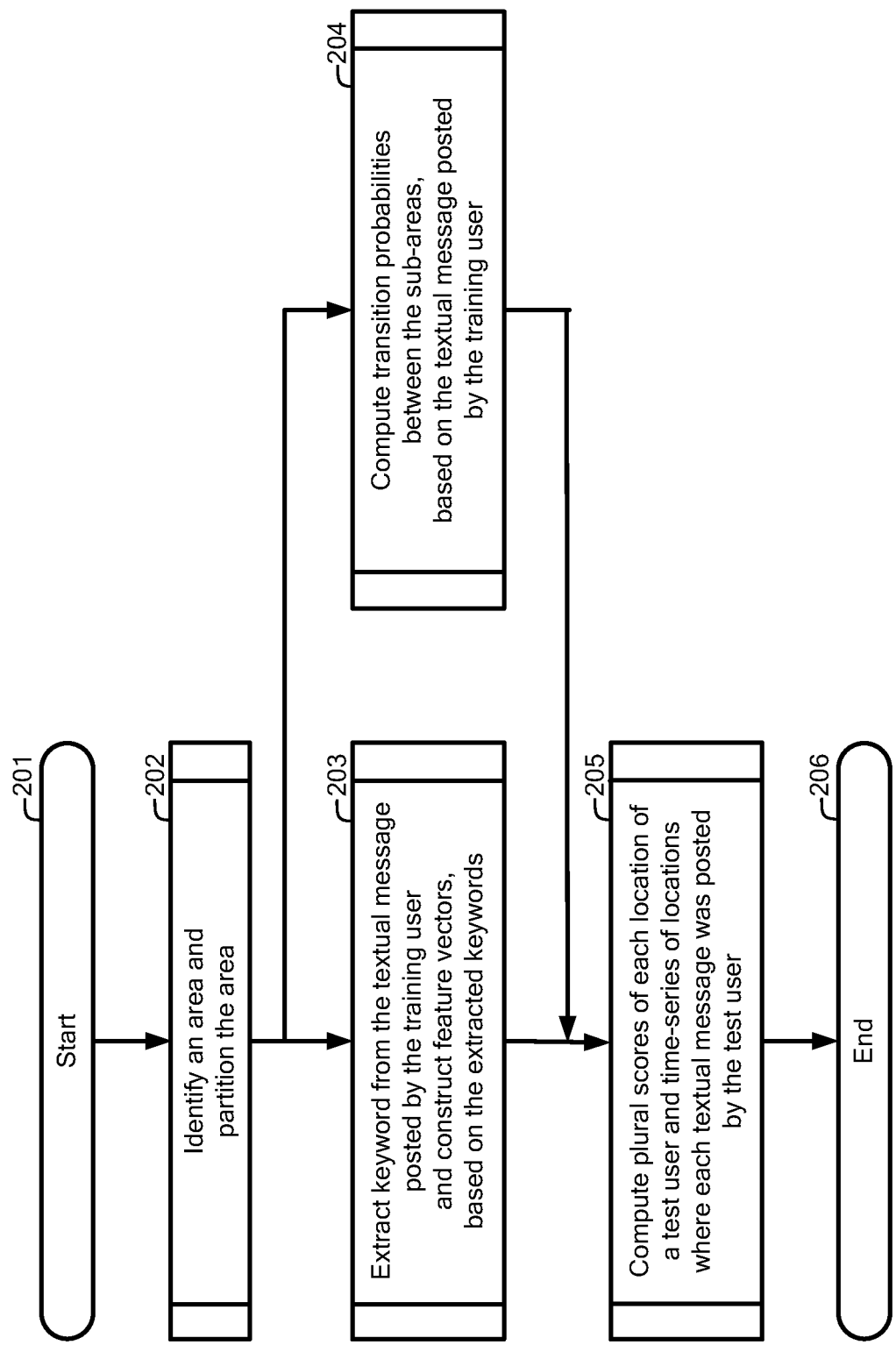

FIG. 2A illustrates one embodiment of the overall flowchart of the method.

In block 201, the system starts the method for inferring a location where each textual message was posted by a test user. The method may include four main blocks 202 to 205, which will be described in further detail below. In the following blocks 202 to 205, the contents of the blocks are briefly explained.

In block 202, the system identifies an area and partitions the identified area into a plurality of sub-areas. The details of block 202 will be illustrated in FIG. 2B described below.

In block 203, the system extracts a keyword from the textual message of each sub-area which the textual message was posted by the training user and constructs feature vectors for each sub-area, based on the extracted keywords. The details of block 203 will be illustrated in FIG. 2C described below.

In block 204, the system computes transition probabilities between the sub-areas, based on the textual message posted by the training user. The details of block 204 will be illustrated in FIG. 2D described below.

The system may perform blocks 203 and 204 simultaneously, or in the order block 203 and 204 or vice versa.

In block 205, the system computes a time series of locations of a test user by obtaining the textual messages from the test users. The details of block 205 will be illustrated in FIG. 2E described below.

In block 206, the system terminates the process.

Figure 2B:
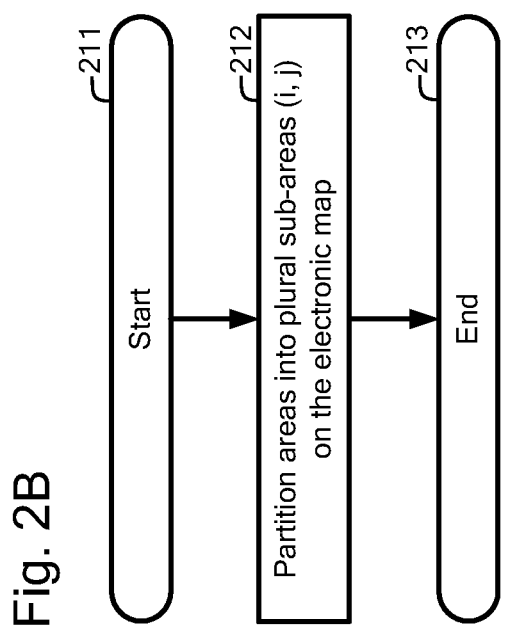

FIG. 2B illustrates one embodiment of block 202 described in FIG. 2A.

In block 211, the system starts the method for identifying an area, such as a geographical location, and partitions the identified area into plural sub-areas.

The area may be a focused area. The focused area may be defined by an administrative user who builds or implements a system or computer program product according to one embodiment of the present principles. The area may be, for example, but not limited to, a unit of a nation, a state, a prefecture, a city, a town or a village, or a region comprising a plurality of combinations of a nation, a state, a prefecture, a city, a town or a village.

The area may be provided as a form of an electronic map. The electronic map may be selected according to the focused area or an area where the training users visited.

In block 212, the system partitions the area into sub-areas (i, j) by any method known to the art, for example, but not limited to, a standard mesh area partition. The sub-areas or grids may have the same or different areas.

Figure 3:
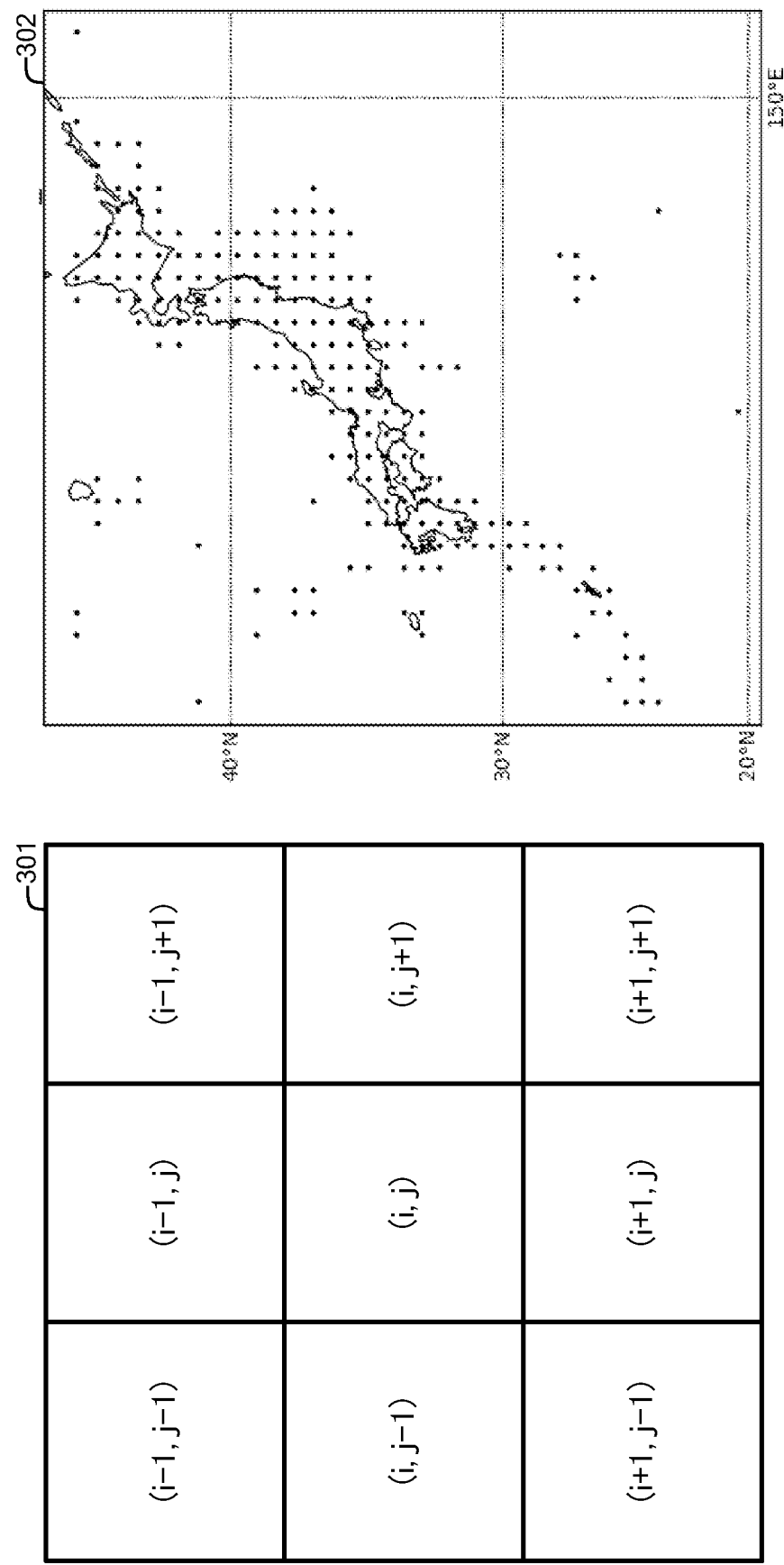
FIG. 3 illustrates one embodiment of an identification of an area and a partitioning of the area.

For example, the system partitions area as grids (i, j) on the electronic map, as seen in FIG. 3 described below.

For ease of explanation, FIG. 3 is now described. FIG. 3 illustrates one embodiment of an identification of an area and a partitioning of the area.

The map (301) shows a part of the focused area. The focused area shows nine sub-areas, or grids. Each grid is represented as follows: grid (i−1, j−1), (i, j−1), (i+1, j−1), (i−1, j), (i, j), (i+1, j), (i−1, j+1), (i, j+1) and (i+1, j+1). The map (301) illustrates the nine sub-areas such that each sub-area has the same area (e.g., same dimensions).

The map (302) shows the focused area, such as, for example, Japan. The map (302) shows that the computer divides areas with known training users' locations into grids whose centers are the locations to be inferred.

In one embodiment, the computer partitions the focused area into a plurality of sub-areas such that the sub-areas are made around the center by dividing the focused area at predefined intervals along the longitude and longitude.

In another embodiment, the computer partitions the focused area into a plurality of sub-areas based on distance to centers in the focused area, where the set of centers is specified beforehand and, for each center, there is a corresponding region consisting of all centers closer to that center than to any other. In order to make the sub-areas according to another embodiment, the system can use a known method in the art such as Voronoi diagram.

Returning back to FIG. 2B, the system partitions the area into sub-areas, according to the following embodiments.

In one embodiment of the present invention, the system may partition the area into plural sub-areas which have a predefined area size (e.g., FIG. 3, map (301)). This partitioning method is useful, for example, when the focused area is a big city.

In another embodiment of the present principles, the system may partition the area into plural sub-areas which have different area sizes. This partitioning method is useful, for example, when the focused area comprises a large city and small city areas, where the system may partition the area such that the sub-area for the large city is smaller than that for the small city. This partitioning method is also useful, for example, when the focused area comprises land and sea, where the system may partition the area such that the sub-area for the land is smaller than that for the sea.

In another embodiment of the present principles, the system may divide the area with a known training user's locations into grids whose centers are the locations to be inferred (e.g., FIG. 3, map (302)).

In block 213, the system terminates the process.

Figure 2C:
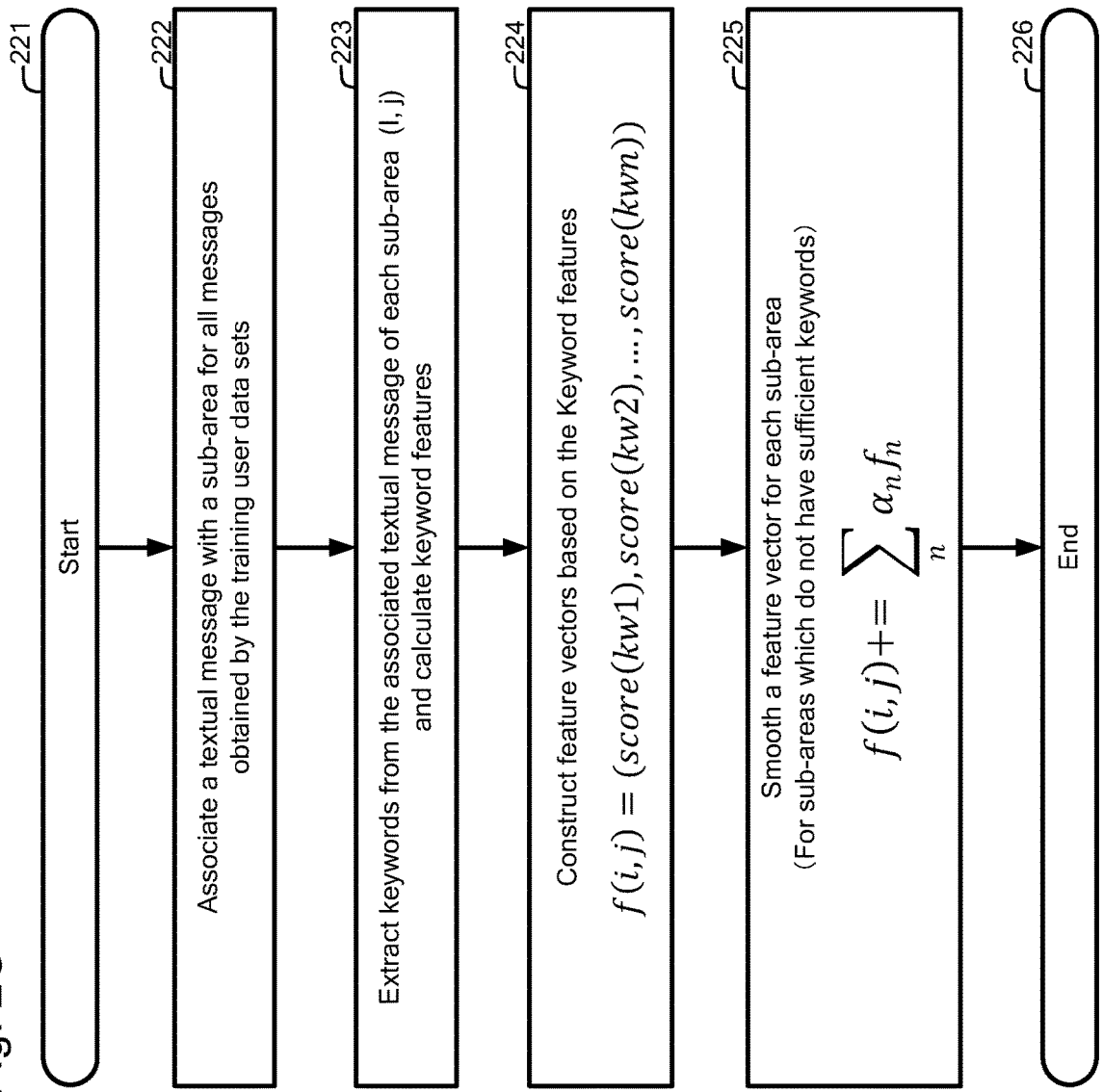

FIG. 2C illustrates one embodiment of block 203 described in FIG. 2A.

In block 221, the system starts the method for extracting keyword features of the sub-areas from training user data sets and constructing a feature vector for each sub-area.

In block 222, the system reads the training user data sets comprising time series of textual messages posted by the training user and locations associated with each of the textual messages. The system associates each textual message with a sub-area where the textual message was posted to make a data set, for example, {sub-area (i, j), textual message 1, textual message 2, . . . , textual message m}, where m is an integer representing the number of textual messages.

The system repeats the association for all messages obtained by the training user data sets.

In block 223, the system extracts a keyword from the associated textual message of each sub-area (i, j) by using data sets obtained in block 222 and calculates keyword features. The system may extract a keyword which characterizes the sub-area among a plurality of keywords obtained from the associated textual messages. The keyword features include, for example, but are not limited to, based on the existence of each keyword, frequency of each keyword, importance of each keyword, or a combination thereof. The importance of each keyword may be obtained by calculating tf-idf.

In block 224, the system constructs a feature vector based on the keyword features, such as the existence of and/or the frequencies of and/or the importance of the extracted keyword.

The initial feature vector of sub-area (i, j) may be defined as follows:

$$f(i,j) = (\text{score}(kw1), \text{score}(kw2), \ldots, \text{score}(kwn))$$

where n is a positive integer representing the number of keywords. The score may be obtained from, for example, but not limited to, tf-idf of frequencies of the keyword. The score may be such as the existence of and/or the frequencies of and/or the importance of the extracted keyword.

Optionally, the system smoothes a feature vector for each sub-area, for example, when there is a sub-area which does not have sufficient keywords. When the smoothing is performed, all sub-areas are subject for smoothing. In one embodiment, the smoothing is performed when each node satisfies a predetermined condition, or when all or parts of nodes satisfy a predetermined condition. A person having ordinary skill in the art can decide such condition.

In most cases, accuracy for inferring a location where textual message was posted is improved when smoothing is performed.

The smoothing is performed according to the following equation:

$$f(i, j) \mathrel{+}= \sum_n \alpha_n f_n$$

where n denotes the number of surrounding feature vectors, n being a positive integer, $\alpha_n$ denotes a weight parameter for a surrounding area a at a position n, each sub-area having the same of different weight, and $f_n$ denotes a feature vector at a position n. The weight parameter may vary according to, for example, an importance of the feature vector.

For example, when the sub-area contains sea, the weight of the above equation may be adjusted to be smaller, but when the sub-area contains land, the weight may be adjusted to be larger. The feature vectors are modified according to block 224.

If smoothing is applied to the map (301), for example, the parameter n is set to eight because there are eight sub-areas around the sub-area (i, j).

In block 226, the system terminates the process.

Figure 2D:
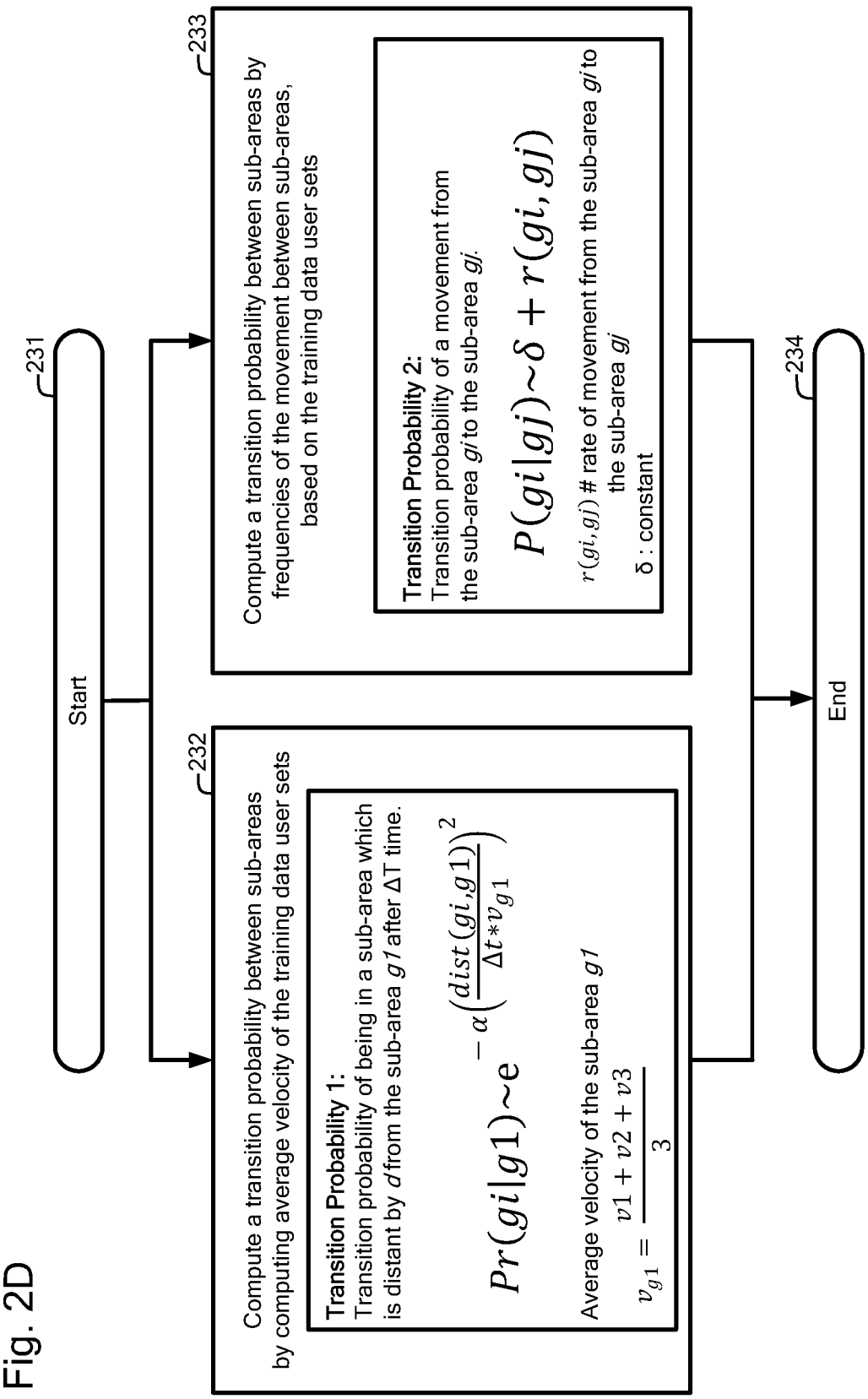

FIG. 2D illustrates one embodiment of block 204 described in FIG. 2A.

In block 231, the system starts the method for extracting moving probabilities of the training user between the sub-areas.

The system may compute a transition probability of the training user from a trend of the movement for the training user data sets. The system may construct the transition probability from the training user data sets by computing the average velocity, frequencies of the movement or means of the movement such as planes, trains, ships, bicycles, cars or on foot.

The computing of the transition probability may include computing the transition probability for each sub-area, based on an average velocity of velocities calculated from training data sets obtained from the training users.

The computing of the transition probability may include computing, using training data sets obtained from the training users, a probability of transition from a target sub-area to other sub-areas which are distant by d from the target sub-area after a predefined time.

The computing of the transition probability may include computing the transition probability for each sub-area, based on frequencies of transition from a target sub-area to other sub-areas. The frequencies may be calculated from training data sets obtained from the training users.

In one embodiment of the preset principles, the system computes the transition probability, according to block 232 or 233 described below.

The method of computing of the transition probability according to block 232 may be based on a transition probability derived from an average velocity within sub-areas.

The method of computing of the transition probability according to block 233 may be based on a transition probability derived from frequency numbers between sub-areas.

In block 232, the system computes a transition probability 1, defined below, between sub-areas by computing an average velocity of the training data user. For example, the system may compute an average velocity of a training user by comparing the time stamp and location of the training user.

An average velocity of the sub-area g1 can be calculated according to the following equation:

$$v_{g1} = \frac{v1 + v2 + v3}{3}$$

Figure 4:
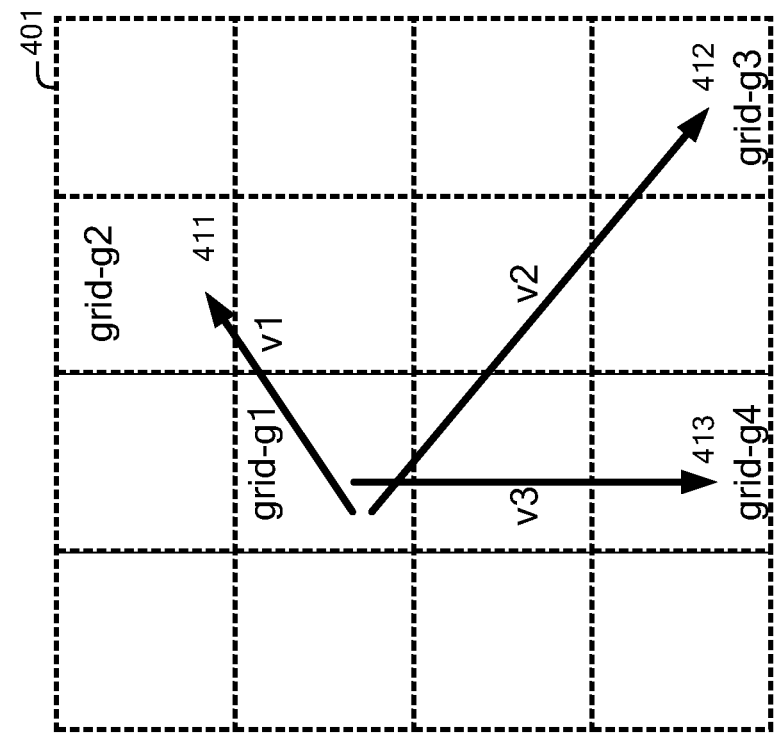
FIG. 4 illustrates one embodiment of computing of an average velocity.

For ease of explanation, FIG. 4 is now explained. FIG. 4 illustrates one embodiment of computing of an average velocity.

The map (401) shows the velocity v1 (411) from the grid g1 to grid g2, the velocity v2 (412) from the grid g1 to grid g3 and the velocity v3 (413) from the grid g1 to grid g4. Accordingly, an average velocity of the grid g1 can be calculated according to the equation above.

Returning back to FIG. 2D, the transition probability 1 is a probability that a user is in a sub-area which is a distance d from the sub-area g1 after Δt time.

The transition probability 1 can be calculated according to the following equation:

$$Pr(gi|g1) \sim e^{-\alpha\left(\frac{dist(gi,g1)}{\Delta t * v_{g1}}\right)^2}$$

where dist(gi, g1) denotes a distance from gi to g1, and α denotes a parameter for varying an average speed.

In block 233, the system computes a transition probability 2, defined below, between sub-areas by frequencies of the movement between sub-areas, based on the training data user set.

The transition probability 2 is the probability of a movement from the sub-area gi to the sub-area gj.

The transition probability 2 can be calculated according to the following equation:

$$P(gi|gj) \sim \delta + r(gi,gj)$$

where r(gi, gj) denotes rate of movement from the sub-area gi to the sub-area gj, and δ denotes a constant. The parameter δ may be experimentally determined and can be used for avoiding zero frequency problem.

In block 234, the system terminates the process.

FIG. 2E illustrates one embodiment of block 205 described in FIG. 2A.

In one embodiment of the present principles, the system computes time-series of locations as Hidden Markov Model (HMM). For example, the system may model location information associated with the textual message posted by the test user as hidden states in the Hidden Markov Model and the textual message as observables in the Hidden Markov Model.

In block 241, the system starts the method for computing time series of locations of a test user by obtaining the textual messages from the test users identifying an area and partitions the identified area into plural sub-areas.

In one embodiment of the present principles, in response to receipt of a textual message posted from a test user, the system may start block 241. In another embodiment of the present principles, in response to receipt of an instruction for inferring a location of a test user, the system may obtain a textual message posted from a test user and start block 241.

In block 242, the system extracts a keyword from the textual message which was posted by a test user and constructs feature vectors, based on the extracted keywords from the test user data set, similar to blocks 223 to 224 described in FIG. 2C.

In block 243, the system computes a plurality of scores of each location for each textual message by using the feature vectors obtained in block 224 or 225 described in FIG. 2C.

The system may compute the locations where the textual messages seem to be posted by the test user with a statistical classifier, for example, but not limited to, the Naïve Bayes Classifier.

Figure 5A:
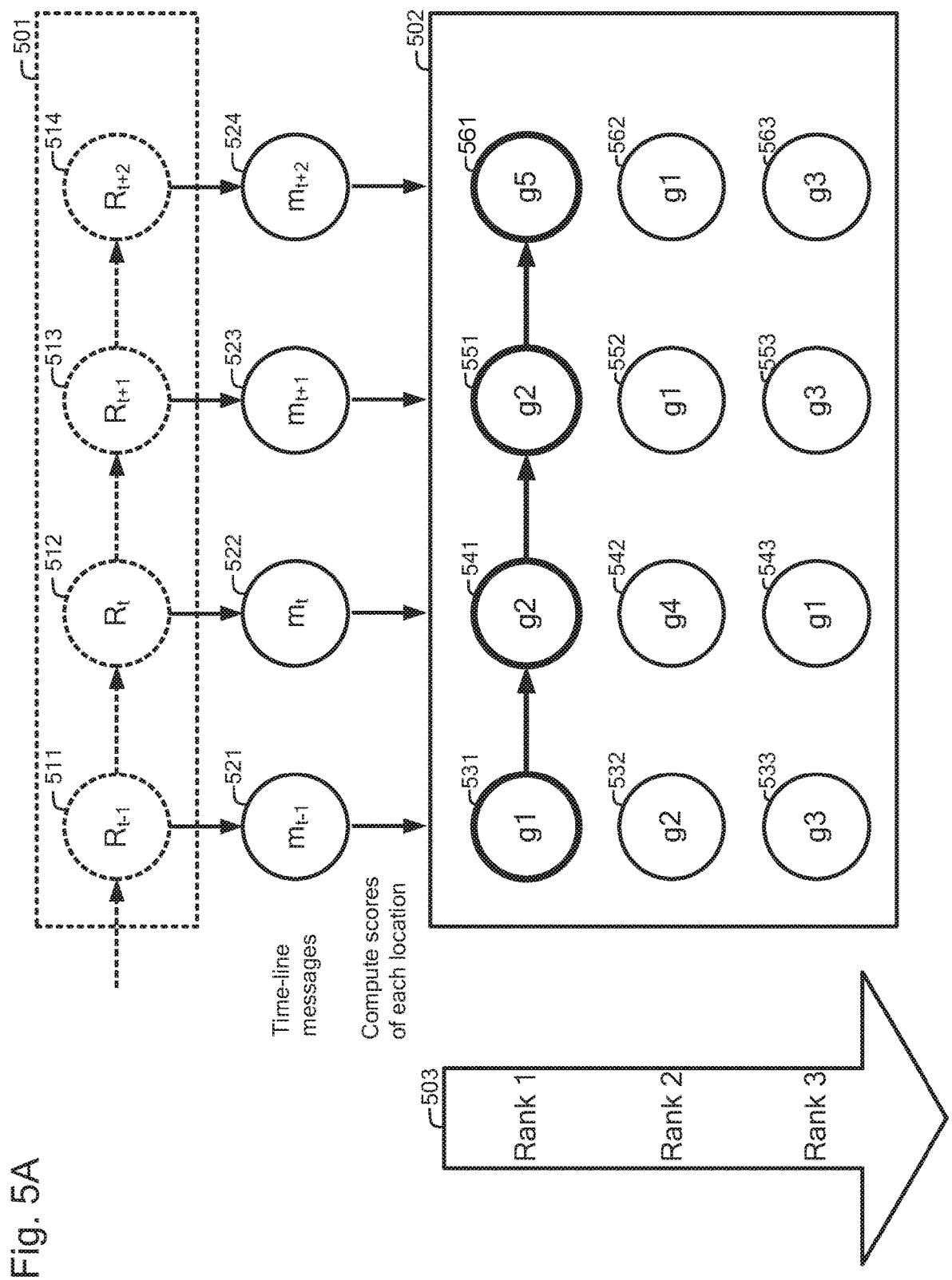
FIG. 5A illustrates one embodiment of computing of time-series of locations, according to a statistical classifier.

For ease of explanation, FIG. 5A is now described. FIG. 5A illustrates one embodiment of computing of time-series of locations, according to a statistical classifier.

Box (501) shows locations ($R_{t-1}$ 511, $R_t$ 512, $R_{t+1}$ 513 and $R_{t+2}$ 514) where each textual messages were posted by a test user. However, the locations ($R_{t-1}$ 511, $R_t$ 512, $R_{t+1}$ 513 and $R_{t+2}$ 514) where each textual messages posted by the test user are now unclear from the textual messages posted by the test user. Accordingly, the locations ($R_{t-1}$ 511, $R_t$ 512, $R_{t+1}$ 513 and $R_{t+2}$ 514) are indicated by dotted line.

Each of the circles $m_{t-1}$ 521, $m_t$ 522, $m_{t+1}$ 523 and $m_{t+2}$ 524) shows time-line textual messages posted in a predefined time.

The system extracts a keyword from the textual message of each sub-area which was posted by the test user and constructs feature vectors for each sub-area, based on the extracted keywords.

The system computes a time-series of locations as Hidden Markov Model, as described above. The system obtains candidate locations by inputting time-lines textual message posted by the test user into the HMM.

The system computes plural scores of each location for the test user using the feature vector for the test user and sorts the locations as seen in box (502). The system computes plural scores for each location provided as the candidate locations, with a statistical classifier, for example, but not limited to, the Nave Bayes Classifier. The system sorts the locations, according to the scores for each textual message. The box (502) shows that each of the candidate locations (g1 531 to g3 533, g1 541 to g3 543, g1 551 to g3

553 and g1 561 to g3 563) is associated with each of the textual messages $m_{t-1}$ 521, $m_t$ 522, $m_{t+1}$ 523 and $m_{t+2}$ 524), respectively.

Accordingly, the time series of location g1 (531), g2 (541), g2 551 and g5 (562), all of which are rank one, are obtained as a result of ranks 1 to 3 (503) with the statistical classifier.

Referring back to FIG. 2E, in block 244, the system computes time-series of location with a dynamic programming algorithm, for example, but not limited to the Viterbi algorithm, based on the transition probability which is obtained in block 232 or 233 described in FIG. 2D.

Figure 5B:
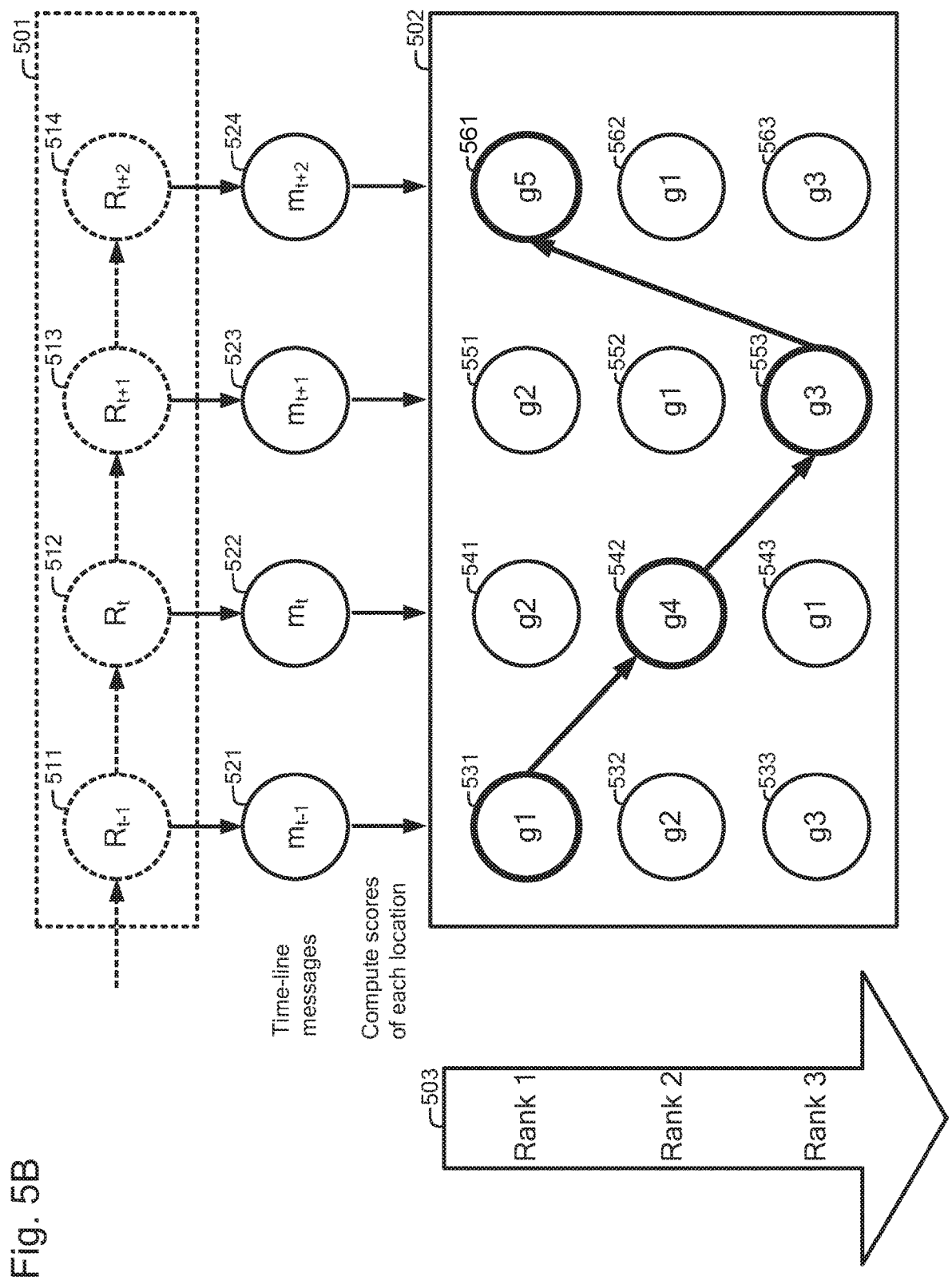
FIG. 5B illustrates one embodiment of computing of the time-series of locations by re-ranking the time series of locations with a dynamic programming algorithm, based on the transition probability.

For ease of explanation, FIG. 5B is now described. FIG. 5B illustrates one embodiment of a computing of the time-series of locations by re-ranking the time series of locations with a dynamic programming algorithm, based on the transition probability.

FIG. 5B illustrates that the locations are selected by using a dynamic programming algorithm, such as Viterbi algorithm, based on the transition probability obtained from blocks 232 or 233 described in FIG. 2D. The system outputs g1 (531), g4 (542), g3 (553) and g5 (562) as most likely time-series of locations where the textual messages ($m_{t-1}$ 521, $m_t$ 522, $m_{t+1}$ 523 and $m_{t+2}$ 524) were posted by the test user. Accordingly, it is inferred that the locations ($R_{t-1}$ 511, $R_t$ 512, $R_{t+1}$ 513 and $R_{t+2}$ 514) where the textual message ($m_{t-1}$ 521, $m_t$ 522, $m_{t+1}$ 523 and $m_{t+2}$ 524) were posted by the test user, respectively, are g1 (531), g4 (542), g3 (553) and g5 (562).

Referring back to FIG. 2E, in block 245, the system terminates the process.

With reference now to FIG. 6, FIG. 6 illustrates another embodiment of computing the time-series of locations by re-ranking the time series of locations with the Viterbi algorithm, based on the transition probability.

The time-line textual messages (601) posted by the test user are shown in circles $m_1$ to $m_5$ (611, 612, 613, 614 and 615).

The system computes plural scores of each location for each textual message by using the Naïve Bayes Classifier.

The graph (602) has a plurality of nodes including a start node and a goal node. The nodes, other than the start node and the goal node, indicate candidate locations where the textual messages seem to be posted. Each node has a location score, as a node value, calculated by the statistical classifier, such as the Naïve Bayes Classifier.

The graph (602) has a plurality of edges between nodes. The edges between the nodes have transition probability as an edge value. The edge value is obtained from block 232 or 233 described in FIG. 2D.

The graph (602) shows candidate locations where the textual messages (601) seem to be posted. The candidate locations (a1, a2 and a3) are for the textual message $m_1$ (611). The candidate locations (b1, b2 and b3) are for the textual message $m_2$ (612). The candidate locations (c1, c2 and c3) are for the textual message $m_3$ (613). The candidate locations (d1, d2, d3 and d4) are for the textual message $m_4$ (614). The candidate locations (e1, e2 and e3) are for the textual message $m_5$ (615).

The graph (602) shows the location values with italic and the transition probabilities with bold.

The system selects a route that maximizes edge scores from the start node to the goal node by using a dynamic programming algorithm, such as Viterbi algorithm. The system selects the locations that are connected to the edges shown with bold from the start node to the goal node.

Accordingly, the system infers that the locations where the textual messages (611, 612, 613, 614 and 615) were posted by the test user are a2→b1→c2→d2→e3, as illustrated in FIG. 6 by the bolded boxes associated with locations a2, b1, c2, d2 and e3.

The system may display, on the display (106) of FIG. 1, the inferred locations where the test user posted the textual message (611, 612, 613, 614 and 615). The system may display, on the display (106) of FIG. 1, one or more among the inferred locations where the test user posted the textual message (611, 612, 613, 614 and 615).

Figure 7:
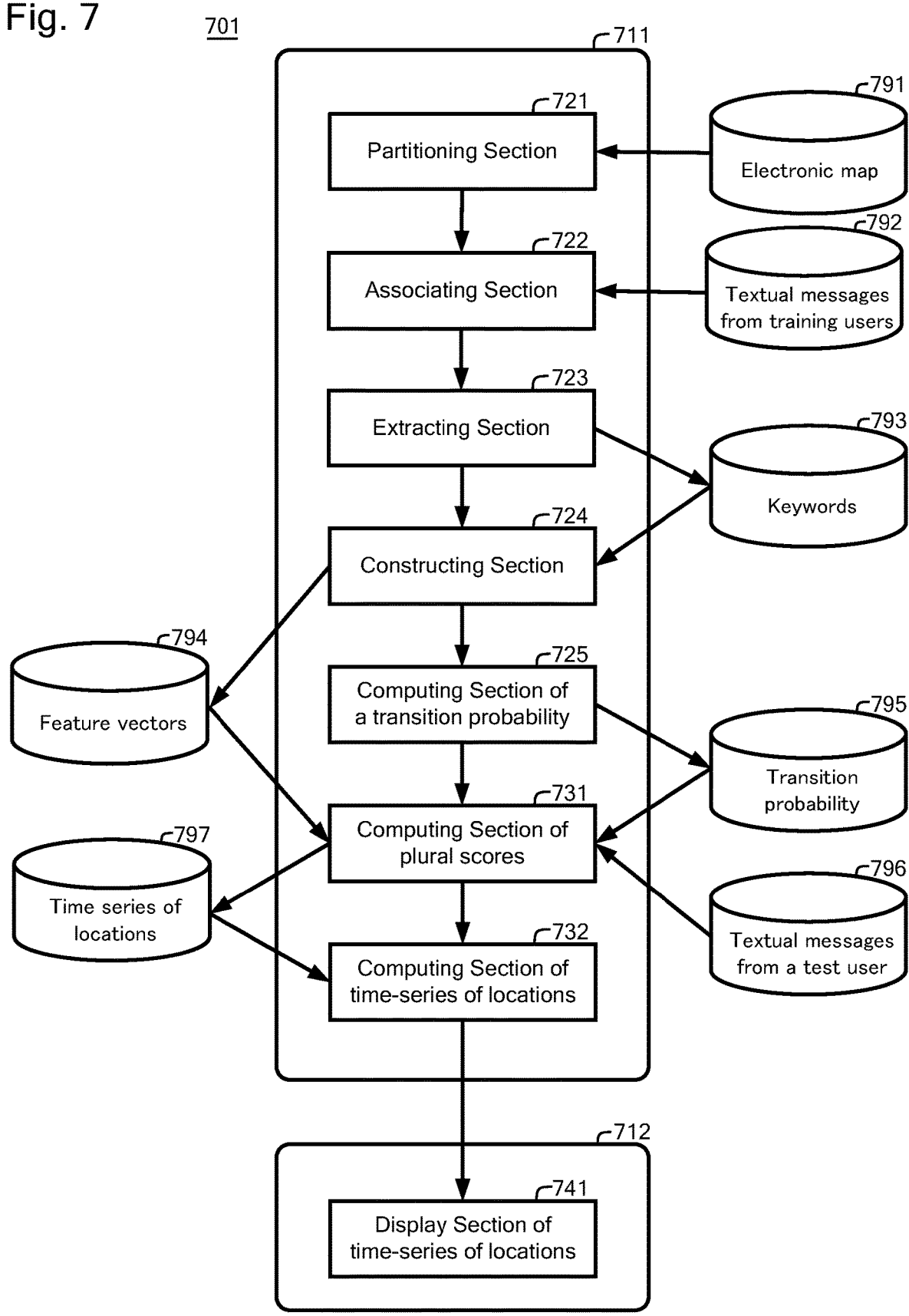
FIG. 7 illustrates one embodiment of an overall functional block diagram of a computer system hardware used in an embodiment of the present invention.

With reference now to FIG. 7, FIG. 7 illustrates one embodiment of an overall functional block diagram of a computer system hardware used in an embodiment according to the present principles.

The system (701) may correspond to the computer (101) described in FIG. 1.

The system (701) may include a first section (711) for inferring a location where each textual message was posted by a test user and, optionally, a second section (712) for displaying the inferred location.

The first section (711) may include a partitioning section (721), an associating section (722), an extracting section (723), a constructing section (724), a computing section of a transition probability (725), a computing section of plural scores (731), and a computing section of time-series of locations (732). The partitioning section (721), the associating section (722), the extracting section (723), the constructing section (724) and the computing section of a transition probability (725) are used for preparing feature vectors and transition probabilities based on the training user data sets. The computing section of plural scores (731) and the computing section of time-series of locations (732) are used for providing inferred location based on the test user data sets.

The partitioning section (721) may perform block 212 described in FIG. 2B.

The associating section (722) may perform block 222 described in FIG. 2C.

The extracting section (723) may perform block 223 described in FIG. 2C.

The constructing section (724) may perform blocks 224 and 245 described in FIG. 2C.

The computing section of a transition probability (725) may perform blocks 232 and 233 described in FIG. 2D.

The computing section of plural scores (731) may perform block 242 described in FIG. 2E.

The computing section of time-series of locations (732) may perform block 243 described in FIG. 2E.

The second section (712) may include a display section of time-series of locations (741).

The display section of time-series of locations (741) may display the time series of the locations where each textual message was posted by the test user.

In an embodiment, the system (701) may include one or more storage devices, such an electronic map database (791), a test messages from training users database (792), a keyword database (793), a feature vector database (794), a transition probability database (795), a textual message from a test user database (796), and a time series of locations database (797). The system (701) may obtain the data stored in the one or more storage devices by a user computer or a server computer.

Example

A test was performed by using the transition probability 1 described in FIG. 2D, block 232, and the transition probability 2 described in FIG. 2D, block 233. For the comparison test, the Naïve Bayes Classifier was used in each of the tests, namely, a test using the transition probability 1 and a test using the transition probability 2.

1. Preparation of user data sets: 1,550 user data sets comprising textual messages and geotag (latitude/longitude) information are prepared. Each textual message is associated with the geotag. The textual messages were posted by user only in Japan. The user data sets were divided into two groups for the training data user sets and for the test user data sets. In this example, the test user data sets include the geotag information for evaluating the accuracy of one embodiment according to the present principles. (Note that the geotag information is not necessary for the test user data sets, according to an embodiment. In an embodiment, the location will be inferred.). For a test using the transition probability 1, the user data sets of 300 users were used for the test user and the remaining data sets were used for the training user data sets. For a test using the transition probability 2, the user data sets of 150 users were used for the test user and the remaining data sets were used for the training user data sets.

2. The method was performed for each of the tests according to one embodiment of the present invention and comparisons tests, according to FIG. 2A, block 202 and FIG. 2B: The electronic map of Japan was partitioned into a plurality of grids, according to a standard mesh area partition. In the experiment, the electronic map was divided with the first-degree mesh, 40 minute latitudes and one-degree longitude.

3. The method was performed for each of the tests according to one embodiment and comparisons tests, according to FIG. 2A, block 203, and FIG. 2C. For each user data sets, namely the training user data sets and the test user data sets, the system specified that two textual messages posted in six hours were time-series of textual messages.

4. The method was performed for each of the tests according to one embodiment and comparisons tests, according to FIG. 2A, block 204, and FIG. 2D.

5. The method was performed for each of the tests according to one embodiment and comparisons tests. For each of the comparison tests, the ranking of the inferred locations was calculated according to the Naïve Bayes Classifier. For each of the tests according to one embodiment, the ranking of the inferred locations was calculated according to an existing method, a statistical classifier, such as the Naïve Bayes Classifier and, after then, the ranking of the inferred location was re-calculated according to a dynamic programming algorithm such as the Viterbi algorithm, based on the transition probability.

6. Evaluation methods: An average error and the worst error of the distance between the location where the textual message was posted and the inferred location were compared between the tests, according to one embodiment, and the comparisons tests.

7. Results: The following results were obtained in each test.

For the test using the transition probability 1, the average error obtained from the test according to one embodiment was improved by about 13% against that obtained from the comparative test. Similarly, the worst error obtained from the test, according to one embodiment, was improved by about 63% against that obtained from the comparative test.

For the test using the transition probability 2, the average error obtained from the test, according to one embodiment, was improved by about 8% against that obtained from the comparative test. Similarly, the worst error obtained from the test, according to one embodiment, was improved by about 27% against that obtained from the comparative test.

8. The average error and the worst error were improved by using one embodiment of the present invention.

A plurality of applications which can implement an embodiment of the present invention is provided hereinafter. For example, the plurality of applications include an estimation of the number of people who visited locations close to the epicenters of pandemics can help efforts to control the spread of communicable diseases, an alert can be delivered which informs users of possible natural disasters which that can happen within and/or near their locations during their movement in real-time or in the future, or relevant information for users such as travelling users can be delivered and displayed on a display.

The present principles may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for inferring a geographical location of a user based on a textual message posted by the user via a mobile device, the method comprising:

partitioning an area identified from the textual message into a plurality of sub-areas each corresponding to a grid on an electronic map; and determining the geographical location of the user based on one or more training feature vectors including one or more scores related to keyword importance of one or more respective training keywords extracted from one or more training textual messages posted by one or more training users via one or more training mobile devices and transition probabilities for respective ones of the plurality of sub-areas each corresponding to a probability that a training user is a distance away from its respective sub-area after an amount of time, the transition probability for a first sub-area being based on an average velocity, the average velocity being calculated over a plurality of velocities between the first sub-area and a plurality of other sub-areas;

wherein one or more training textual messages are associated with respective geographical locations corresponding to sub-areas where the one or more training textual messages were posted by the one or more training mobile devices as determined from publicly available data, and wherein determining the geographical location further includes:

extracting one or more keywords from the textual message;

constructing one or more feature vectors including one or more scores related to keyword importance of respective ones of the one or more keywords;

computing, using the one or more feature vectors and the one or more training feature vectors, a plurality of scores each corresponding to a respective candidate sub-area associated with a candidate geographical location where the textual message was posted; and computing, based on the plurality of scores and the transition probabilities, time-series of location information to infer the geographical location of the user.

2. The method according to claim 1, further comprising generating the one or more training feature vectors and the transition probabilities, including:
associating the one or more training textual messages with the respective ones of the geographical locations where the one or more training textual messages were posted;
extracting the one or more training keywords from each training textual message;
constructing the one or more training feature vectors based on features of the one or more training keywords associated with training keyword importance; and
computing the transition probabilities for respective ones of the plurality of sub-areas based on transitions of the one or more training users, wherein the transition probability for a target sub-area is a probability that a user is in another sub-area that is a given distance away from the target sub-area after a given time.

3. The method according to claim 2, wherein constructing the one or more training feature vectors further comprises smoothing the one or more training feature vectors.

4. The method according to claim 1, wherein the user is dynamically moving with the mobile device.

5. The method according to claim 1, wherein the plurality of scores is computed with a statistical classifier.

6. The method according to claim 1, wherein the geographical location is determined using a Hidden Markov Model.

7. The method according to claim 1, further comprising performing at least one action implementing the geographical location of the user.

8. The method according to claim 7, wherein performing the at least one action includes displaying the time series of location information.

9. A system for inferring a geographical location of a user based on a textual message posted by the user via a mobile device, the system comprising:
a processor; and
a memory storing a program, which, when executed on the processor, performs a method comprising:
partitioning an area identified from the textual message into a plurality of sub-areas each corresponding to a grid on an electronic map; and
determining the geographical location of the user based on one or more training feature vectors including one or more scores related to keyword importance of one or more respective training keywords extracted from one or more training textual messages posted by one or more training users via one or more training mobile devices and transition probabilities for respective ones of the plurality of sub-areas each corresponding to a probability that a training user is a distance away from its respective sub-area after an amount of time, the transition probability for a first sub-area being calculated based on an average velocity, the average velocity being calculated over a plurality of velocities between the first sub-area and a plurality of other sub-areas;
wherein one or more training textual messages are associated with respective geographical locations corresponding to sub-areas where the one or more training textual messages were posted by the one or more training mobile devices as determined from publicly available data, and wherein determining the geographical location further includes:
extracting one or more keywords from the textual message;
constructing one or more feature vectors including one or more scores related to keyword importance of respective ones of the one or more keywords;
computing, using the one or more feature vectors and the one or more training feature vectors, a plurality of scores each corresponding to a respective candidate sub-area associated with a candidate geographical location where the textual message was posted; and
computing, based on the plurality of scores and the transition probabilities, time-series of location information to infer the geographical location of the user.

10. The system according to claim 9, wherein the method further includes generating the one or more training feature vectors and the transition probabilities, including:
associating the one or more training textual messages with the respective ones of the geographical locations where the one or more training textual messages were posted;
extracting the one or more training keywords from each training textual message;
constructing the one or more training feature vectors based on features of the one or more training keywords associated with training keyword importance; and
computing the transition probabilities for respective ones of the plurality of sub-areas based on transitions of the one or more training users, wherein the transition probability for a target sub-area is a probability that a user is in another sub-area that is a given distance away from the target sub-area after a given time.

11. The system according to claim 9, wherein the geographical location is determined using a Hidden Markov Model.

12. The system according to claim 9, further comprising performing at least one action implementing the geographical location of the user.

13. The system according to claim 12, wherein performing the at least one action includes displaying the time series of location information.

14. A computer program product for inferring a geographical location of a user based on a textual message posted by the user via a mobile device, the computer program product comprising a non-transitory computer readable storage medium having program instructions embodied therewith, the program instructions executable by a computer to cause the computer to perform a method comprising:
partitioning an area identified from the textual message into a plurality of sub-areas each corresponding to a grid on an electronic map; and
determining the geographical location of the user based on one or more training feature vectors including one or more scores related to keyword importance of one or more respective training keywords extracted from one or more training textual messages posted by one or more training users via one or more training mobile devices and transition probabilities for respective ones of the plurality of sub-areas each corresponding to a probability that a training user is a distance away from its respective sub-area after an amount of time, the transition probability for a first sub-area being calculated based on an average velocity, the average velocity being calculated over a plurality of velocities between the first sub-area and a plurality of other sub-areas;

wherein one or more training textual messages are associated with respective geographical locations corresponding to sub-areas where the one or more training textual messages were posted by the one or more training mobile devices as determined from publicly available data, and wherein determining the geographical location further includes:
  extracting one or more keywords from the textual message;
  constructing one or more feature vectors including one or more scores related to keyword importance of respective ones of the one or more keywords;
  computing, using the one or more feature vectors and the one or more training feature vectors, a plurality of scores each corresponding to a respective candidate sub-area associated with a candidate geographical location where the textual message was posted; and
  computing, based on the plurality of scores and the transition probabilities, time-series of location information to infer the geographical location of the user.

15. The computer program product according to claim 14, wherein the method further includes generating the one or more training feature vectors and the transition probabilities, including:
  associating the one or more training textual messages with the respective ones of the geographical locations where the one or more training textual messages were posted;
  extracting the one or more training keywords from each training textual message;
  constructing the one or more training feature vectors based on features of the one or more training keywords associated with training keyword importance; and
  computing the transition probabilities for respective ones of the plurality of sub-areas based on transitions of the one or more training users, wherein the transition probability for a target sub-area is a probability that a user is in another sub-area that is a given distance away from the target sub-area after a given time.

16. The computer program product according to claim 15, wherein constructing the one or more training feature vectors further comprises smoothing the one or more training feature vectors.

17. The computer program product according to claim 14, wherein the user is dynamically moving with the mobile device.

18. The computer program product according to claim 14, wherein the plurality of scores is computed with a statistical classifier.

19. The computer program product according to claim 14, wherein the geographical location is determined using a Hidden Markov Model.

20. The computer program product according to claim 14, wherein the method further includes performing at least one action implementing the geographical location of the user, including displaying the time series of location information.

* * * * *